United States Patent [19]
Shephard

[11] 3,788,398
[45] Jan. 29, 1974

[54] OIL RECOVERY PROCESS

[75] Inventor: Cecil A. Y. Shephard, Calgary, Alberta, Canada

[73] Assignee: Mobil Oil Corporation, New York, N.Y.

[22] Filed: Dec. 1, 1971

[21] Appl. No.: 203,762

[52] U.S. Cl. ................ 166/269, 166/273, 166/274
[51] Int. Cl. ............................................. E21b 43/16
[58] Field of Search ... 166/265, 266, 267, 268, 269, 166/273, 274, 306

[56] References Cited
UNITED STATES PATENTS

| | | | |
|---|---|---|---|
| 2,885,003 | 5/1959 | Lindaver | 166/274 |
| 3,131,760 | 5/1964 | Arenot et al. | 166/268 |
| 3,223,157 | 12/1965 | Lacey et al. | 166/273 |
| 2,842,204 | 7/1958 | Horner | 166/268 |
| 2,936,030 | 5/1960 | Allen | 166/306 |
| 3,312,278 | 4/1967 | Warden | 166/274 |
| 3,319,712 | 5/1967 | O'Brien | 166/273 |
| 3,495,661 | 2/1970 | Gogarty | 166/274 |

OTHER PUBLICATIONS

"Unique Miscible Program in the Mill," May 9, 1960, pp. 100–101.

*Primary Examiner*—Marvin A. Champion
*Assistant Examiner*—Jack E. Ebel
*Attorney, Agent, or Firm*—Andrew L. Gaboriault et al.

[57] ABSTRACT

This specification discloses a process of recovering oil from an oil-containing reservoir having a gas cap. In accordance with this process there is injected into the gas cap a fluid that is miscible with the oil in the reservoir and gas in the gas cap. Also injected into the reservoir are gas and water in an amount no greater than that amount which can be maintained within the gas cap without flowing into the oil zone. Oil is produced from the reservoir from locations that are structurally lower than the gas cap.

5 Claims, 1 Drawing Figure

PATENTED JAN 29 1974
3,788,398
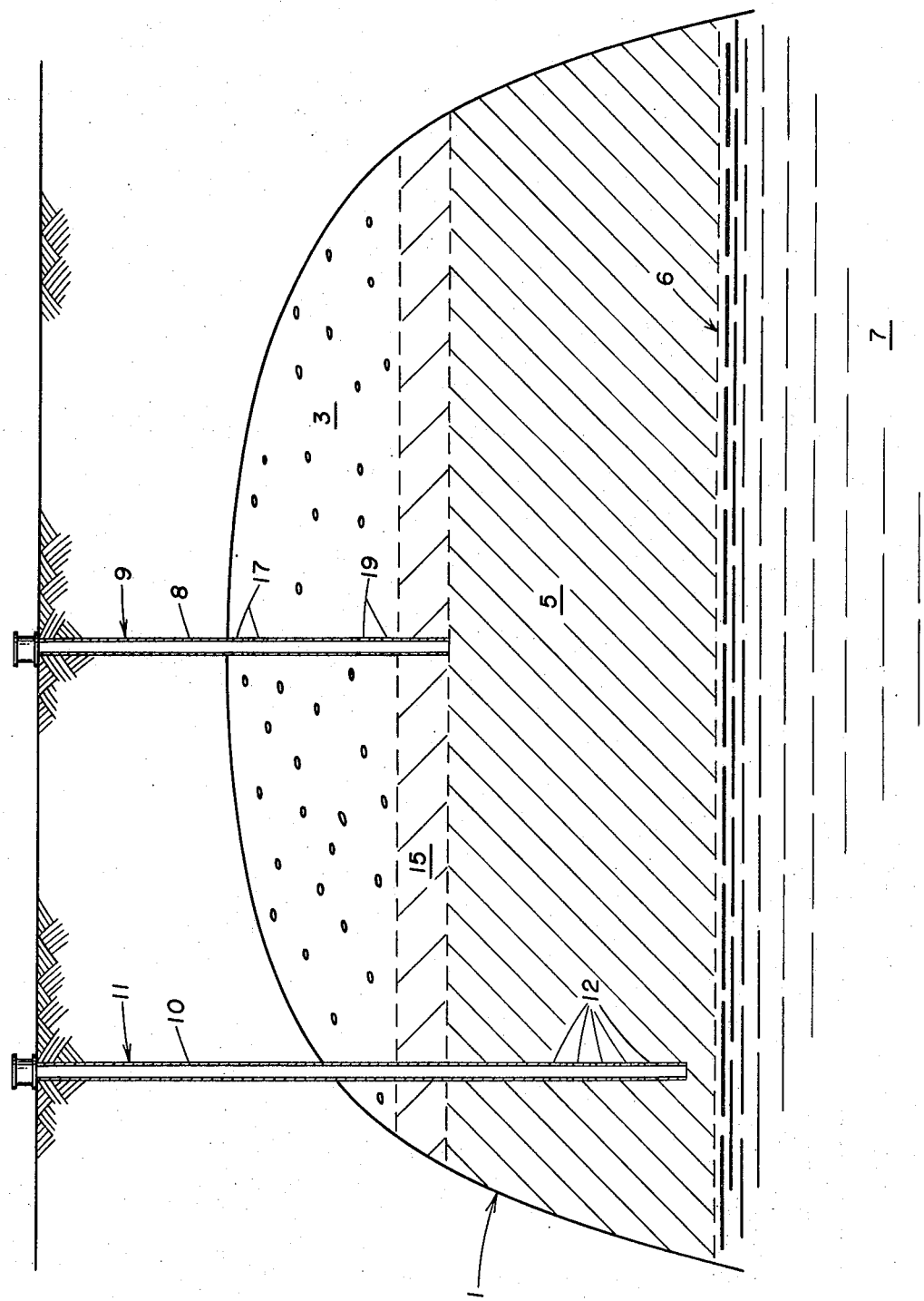
CECIL A.Y. SHEPHARD
INVENTOR
BY [signature]
ATTORNEY

OIL RECOVERY PROCESS

BACKGROUND OF THE INVENTION

This invention is directed to a method of recovering oil from an oil-containing subterranean reservoir wherein gas and water are injected into the crest of the reservoir and the oil is produced from a location structurally lower or down dip of the crest.

Efforts have long been made to efficiently utilize the energy of expanding gas in the production of oil from subterranean reservoirs. In the case of a primary gas cap there exists a large body of free gas trapped and stored under pressure in or near the crest of a subterranean reservoir. The gas cap exerts pressure downwardly against the surface of the underlying oil, tending to drive it down toward recovery wells located at down dip or structurally lower locations of the reservoir. As oil is produced from the structurally lower wells, the gas expands, thereby expending energy and occupying the volume formerly occupied by the produced oil. To offset this expended energy and consequent decrease in pressure, gas has been injected into the crests of such reservoirs.

In addition to primary gas caps which exist in equilibrium within a reservoir prior to the reservoir being penetrated by a well, secondary gas caps may be formed during the production of oil from the reservoir. The production of oil from a reservoir necessarily leaves space therein which space may be filled by gas that is evolved from the oil. The gas, being lighter than the oil in the formation, tends to flow upward and collect at the crest of the reservoir.

SUMMARY OF THE INVENTION

This invention concerns a method of producing oil from a subterranean reservoir having an oil zone and a gas cap. A fluid that is miscible with the oil in the oil zone and is also miscible with gas in the gas cap is injected via an injection well into the gas cap. There is also injected into the gas cap water in an amount less than the amount required to extend the water into the oil zone and oil is produced from the reservoir via a production well.

BRIEF DESCRIPTION OF THE DRAWING

The drawing is a schematic view illustrating a subterranean reservoir penetrated by wells and containing therein a gas cap, oil zone, and an underlying water zone.

DESCRIPTION OF THE PREFERRED EMBODIMENTS

In accordance with this invention there is provided a method of producing oil from a subterranean oil-containing reservoir having a gas cap. The gas cap may be a primary gas cap originally present in the reservoir or a secondary gas cap formed in the reservoir after production has been initiated. Water and a fluid which is miscible at reservoir conditions with the oil in the reservoir and gas in the gas cap are injected into the gas cap. Gas may also be injected into the gas cap to supply additional energy for driving the miscible fluid and oil in the reservoir to production wells which communicate with the reservoir at locations that are structurally lower than or down dip of the gas cap. The water is injected into the gas cap in an amount less than that amount which would result in extending the water into the oil zone. This water decreases the volume of the reservoir that is occupied by gas and increases the effectiveness of the gas within the gas cap in driving the miscible fluid and oil downwardly to production wells located at structurally lower locations of the reservoir. Further, this injection of water into the gas cap lessens the amount of gas that need be injected into the gas cap to supply a given amount of energy, thus conserving gas and making this process very desirable for use when gas is expensive or in short supply.

Referring to the drawing, there is illustrated a subterranean reservoir 1 having a gas zone or gas cap 3, an oil zone 5, and an underlying water zone 7. An injection well 9 is illustrated as penetrating the gas cap 3 near the crest of the reservoir and a production well 11 is illustrated as penetrating the oil zone 5 down structure from the crest. Both injection well 9 and production well 11 may be completed by conventional techniques which may include open hole completions and completions employing casing having perforations therethrough. It is to be understood that injection well 9 and production well 11 are used as illustrative of an injection system and a production system penetrating the reservoir 1. Both the injection system and the production system may include a plurality of wells. Further, one or more dually completed wells may be employed as both injection and production wells. However, for clarity in describing the method of this invention, reference is made to injection well 9 and production well 11 rather than a system of such wells.

In accordance with this invention a fluid that is miscible at reservoir conditions with the oil in oil zone 5 and gas in gas cap 3 is injected via injection well 9 into gas cap 3. Preferably, the miscible fluid is injected in an amount sufficient to form a miscible fluid "blanket" 15 overlying oil zone 5, as illustrated in the drawing. It has been found desirable in forming such a blanket to inject the miscible fluid into the reservoir in an amount of at least one percent of the hydrocarbon pore volume of the reservoir. As oil is produced through the production well 11 located down structure of the gas cap 3, the miscible fluid flows into the portion of the reservoir formerly occupied by oil zone 5 and scrubs the oil from the reservoir, thereby increasing the oil recovery.

A preferred miscible fluid for use in carrying out the method of this invention is LPG (liquified petroleum gas) which is a mixture of hydrocarbons comprised primarily of propane and butane. LPG is readily and economically available and is an efficient fluid for scrubbing oil from the reservoir and increasing the recovery of oil therefrom. Other miscible fluids, either in gaseous or liquid states in the reservoir, may be employed in carrying out this invention. For example, a so-called "enriched gas," comprised primarily of methane and ethane but which may also include higher molecular weight hydrocarbons, may be injected via injection well 9 into gas cap 3 and there maintained at a sufficient pressure to be miscible with the oil in oil zone 5 and the gas in gas cap 3.

Water is injected down injection well 9 and into gas cap 3 to occupy part of the pore space existing in gas cap 3. The water may be injected into gas cap 3 prior to, concurrent with, or subsequent to the injection of the miscible fluid. The water injected into gas cap 3 decreases the volume of the reservoir that is occupied by gas and thereby increases the effectiveness of the gas in gas cap 3 in displacing the oil in oil zone 5 downwardly toward production well 11. The water is injected into the gas cap 3 in an amount no greater than the amount which may be maintained in the gas cap without extending the water into oil zone 5.

The amount of water which may be injected into the gas cap 3 in accordance with this invention depends upon the characteristics of the reservoir and the location at which the gas and water are injected into the gas cap. One such characteristic is the ability of the rocks of the reservoir to hold some amount of water within the pore spaces thereof in a relatively immobile state. This amount of water which may be held in a relatively immobile state may be determined by carrying out well-known laboratory analyses of cores taken from the reservoir. Many reservoirs, and in particular portions of reservoirs occupied by gas caps, are undersaturated as to water. That is, they are capable of holding relatively immobile a much greater amount of water than they initially contain. Another characteristic of the reservoir which affects the amount of water which may be held within the gas cap is the ratio of the horizontal permeability to the vertical permeability. A large horizontal-to-vertical permeability ratio indicates that the water injected into the gas cap may be distributed horizontally throughout much of the gas cap while being distributed downwardly to a much lesser extent. It is preferred that this invention be carried out in a reservoir having a horizontal-to-vertical permeability ratio in excess of 1 in order to obtain a suitable distribution of water throughout the gas cap. Further, it is preferred to inject the water near the crest of the reservoir and into the upper portion of the gas cap in order to obtain a better distribution of the water throughout the gas cap.

Oil is produced from oil zone 5 into production well 11 through, for example, perforations 12 provided in casing 10 and thence to the surface of the earth via production well 11.

In accordance with an embodiment of this invention, gas is injected down injection well 9 and into gas cap 3 to maintain or increase the pressure in gas cap 3 and thereby supply energy to drive the miscible solvent and oil downwardly toward production well 11. Preferably, gas is injected through perforations 19 provided in casing 8 in injection well 9 and into a lower location of gas cap 3 while water is simultaneously injected through perforations 17 provided in casing 8 in injection well 9 and into an upper location of gas cap 3 near the crest of the reservoir. The water flows outwardly and downwardly as it is spread throughout the gas cap 3. The gas serves to retard the downward flow of water and lessen the chance of the water flowing into the oil zone. This lessens the chance of a loss of oil production which could result either from the water bypassing and isolating portions of the oil within the oil zone 5 or by the raising of the oil-water contact 6 between oil zone 5 and water zone 7. In addition, other techniques may be employed in injecting the water and the gas into gas cap 3. The water and gas may be combined into one stream and injected into the gas cap 3 in order to better spread the water throughout gas cap 3. Also, the water and gas may be alternately injected into gas cap 3 with the resulting advantage of enabling the use of supplies of gas and water as they become available rather than requiring their use in accordance with a set time schedule. It is preferred that the gas employed in carrying out this invention be natural gas. Natural gas which is comprised primarily of methane is normally readily and economically available in the vicinity of oil reservoirs.

It is readily seen that within the teachings of this invention injection well 9, for example, could be extended into oil zone 5 and completed by conventional multiple completion techniques and thus serve both as an injection and a production well. Also, perforations 17 may be isolated by well-known techniques from perforations 19 and thus allow different fluids to be simultaneously or alternately flowed through perforations 17 and 19. A system of wells may also be employed wherein different wells may be selected for injecting the different fluids into the reservoir.

I claim:

1. A method of producing oil from a subterranean reservoir having an oil zone and a gas cap, said gas cap being penetrated by an injection system and said oil zone being penetrated by a production system, comprising the steps of:
    a. injecting via said injection system into said gas cap a fluid that is miscible with the oil in said oil zone and the gas in said gas cap;
    b. injecting gas via said injection system into said gas cap;
    c. injecting via said injection system into said gas cap water in an amount less than the amount required to extend the water into said oil zone; and
    d. producing oil via said production system from said reservoir.

2. The method of claim 1 wherein gas and water are alternately injected into said gas cap.

3. The method of claim 1 wherein said gas is natural gas.

4. A method of producing oil from a subterranean reservoir having an oil zone and a gas cap, said gas cap being penetrated by an injection system and said oil zone being penetrated by a production system, comprising the steps of:
    a. injecting via said injection system into said gas cap a fluid that is miscible with the oil in said oil zone and the gas in said gas cap;
    b. injecting gas via said injection system into said gas cap, said gas being injected into said gas cap at a lower location thereof;
    c. injecting via said injection system into said gas cap water in an amount less than the amount required to extend the water into said oil zone, said water being injected into said gas cap at an upper location thereof; and
    d. producing oil via said production system from said reservoir.

5. The method of claim 4 wherein said gas and said water are simultaneously injected into said reservoir.

* * * * *